United States Patent [19]

Matsuda et al.

[11] 4,425,619

[45] Jan. 10, 1984

[54] SELECTIVE READ OUT OF ONE HOUR TRANSACTION DATA IN AN ELECTRONIC CASH REGISTER

[75] Inventors: Kumehiko Matsuda, Joyo; Hachizou Yamamoto, Nara, both of Japan

[73] Assignee: Sharp Kabushiki Kaisha, Osaka, Japan

[21] Appl. No.: 274,532

[22] Filed: Jun. 17, 1981

[30] Foreign Application Priority Data

Jun. 23, 1980 [JP] Japan .................................. 55-85772

[51] Int. Cl.³ .......................................... G06F 15/20
[52] U.S. Cl. ................................... 364/405; 364/710
[58] Field of Search ................. 364/405, 569, 705, 710

[56] References Cited

U.S. PATENT DOCUMENTS 4,186,439  1/1980  Shimura et al. ..................... 364/405
4,245,311  1/1981  Nakamura .......................... 364/405
4,283,769  8/1981  Asada .................................. 364/710

Primary Examiner—Charles E. Atkinson
Attorney, Agent, or Firm—Birch, Stewart, Kolasch & Birch

[57] ABSTRACT

An electronic cash register includes a transaction data memory having 24 (twenty-four) memory sections each of which is assigned to store the transaction amount registered in a preselected one hour. A selection system is associated with each of the memory sections for selecting a desired memory section in the transaction data memory. The transaction data stored in the selected memory section is applied to a printer system, whereby the transaction data stored in the selected memory section is printed onto a journal paper and/or a receipt slip for administration purposes.

5 Claims, 1 Drawing Figure

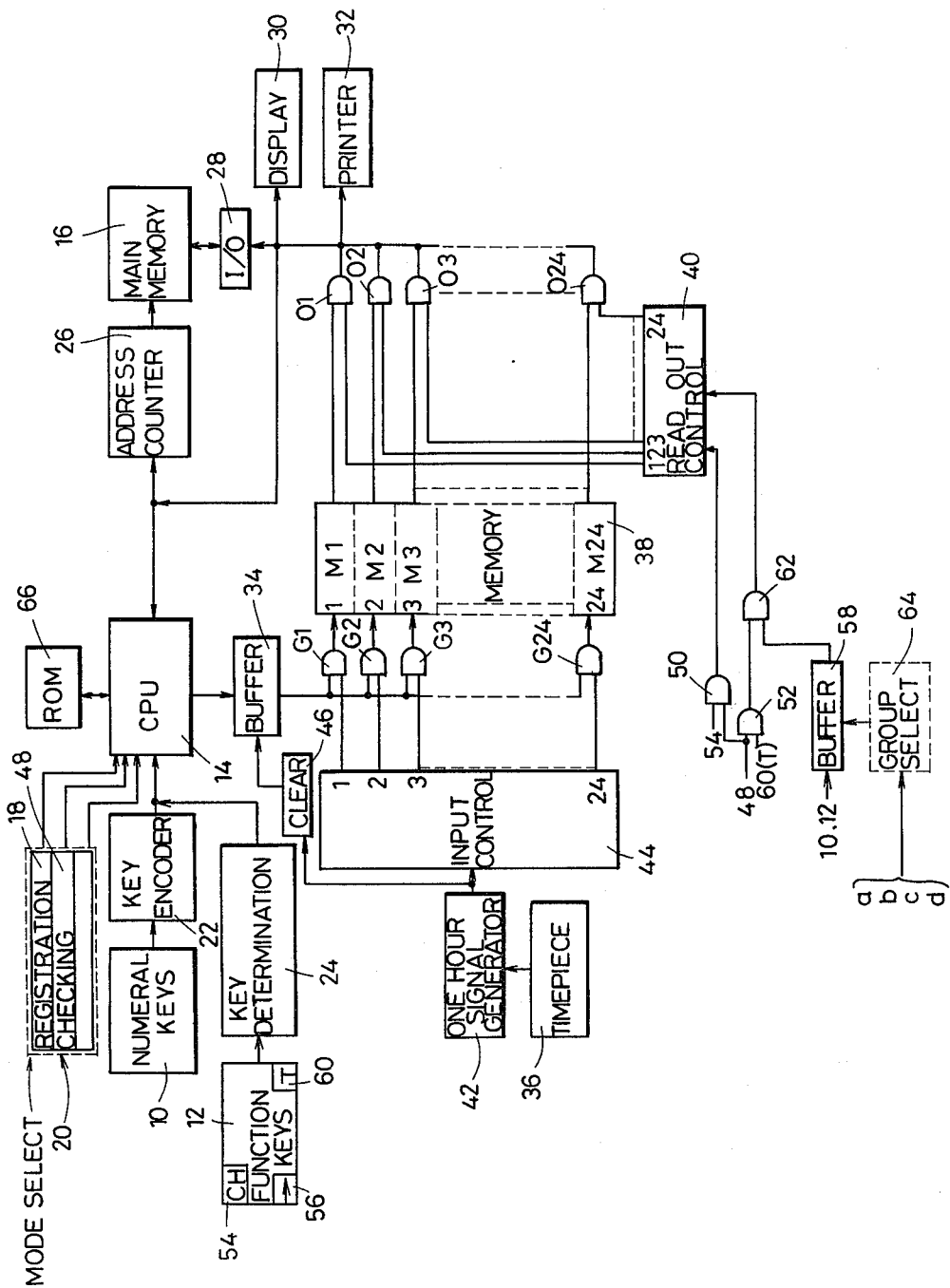

SELECTIVE READ OUT OF ONE HOUR TRANSACTION DATA IN AN ELECTRONIC CASH REGISTER

BACKGROUND AND SUMMARY OF THE INVENTION

The present invention relates to an electronic cash register and, more particularly, to an electronic cash register which can accumulate the transaction data on a time zone basis.

An electronic cash register has been developed which includes a time information keeping circuit and a memory system for storing the transaction amount registered into the electronic cash register in a selected period of time.

A typical construction of the above-mentioned electronic cash register is disclosed in U.S. Pat. No. 4,186,439, "ELECTRONIC CASH REGISTER FOR TOTALIZING SALES DATA ON A TIME ZONE BASIS", issued on Jan. 29, 1980. The system disclosed in U.S. Pat. No. 4,186,439 functions to store the accumulated transaction data registered in a preselected period of time. However, the read out of the stored data is conducted in a fixed manner. Therefore, the system is not suited for obtaining the desired data.

Accordingly, an object of the present invention is to provide a novel read out system in an electronic cash register for reading out the transaction data registered in a preselected period of time.

Another object of the present invention is to provide a control system for obtaining an accumulation of the transactions conducted in a period of time of which period is variably selected when the read out operation is conducted.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a time information keeping circuit is disposed in an electronic cash register for developing a one hour control signal upon every o'clock. A memory system is provided for storing the transaction amount which is registered in one hour. Thus, in a preferred form, the memory system has twenty-four (24) memory sections for storing the transaction amount. A read out control circuit is responsive to a section identifying signal derived from a keyboard panel, whereby a desired memory section is selected to read out the transaction data stored in the memory system.

BRIEF DESCRIPTION OF THE DRAWING

The present invention will be better understood from the detailed description given hereinbelow and the accompanying drawing which is given by way of illustration only, and thus is not limitative of the present invention and wherein:

The single drawing FIGURE is a block diagram of an embodiment of an electronic cash register of the present invention.

DESCRIPTION OF THE PREFERRED EMBODIMENTS

An electronic cash register generally includes a numeral information key input panel 10, a function key panel 12, a central processor unit 14, and a main memory 16.

For performing the normal registration operation, a registration mode key 18 included in a mode selection switch 20 is actuated to place the electronic cash register in the normal registration operation mode. First, the numeral information representing the number of commodities purchased by a customer is introduced from the numeral information key input panel 10. The numeral information is introduced into the central processor unit 14 through a key encoder 22. Then a specific department key, included in the function key panel 12, representing a specific department to which the purchased commodity belongs, is actuated. The department information is introduced into the central processor unit 14 through a key determination circuit 24. The central processor unit 14 functions to select a predetermined memory section of the main memory 16 via an address counter 26, thereby reading out the unit cost data through an input/output circuit 28. The central processor unit 14 functions to conduct the calculation, (number of commodities) × (unit cost), and the calculation result is introduced into the memory section in the main memory 16 assigned to the selected department. The calculation result is displayed on a display panel 30, and is further applied to a printer system 32 for printing out the calculation result onto a receipt slip and/or a journal paper.

When the registration operation related to one customer is completed, a total key included in the function key panel 12 is actuated. The central processor unit 14 functions to total the transaction amount related to the customer, and the total amount is introduced into an accumulation section provided in the main memory 16. The total amount is also applied to the display panel 30 and the printer system 32. The total amount is further applied to a buffer memory 34 associated with a memory system of the present invention.

The electronic cash register of the present invention further includes a time information keeping circuit 36, a transaction data memory 38 for storing accumulated transaction data which is registered in one hour, and a read out control circuit 40.

The time information derived from the time information keeping circuit 36 is applied to a one hour signal generator 42, which develops a one hour control signal upon every o'clock. The one hour control signal obtained by the one hour signal generator 42 is applied to an input control circuit 44, which develops selection signals 1 through 24 for selecting a desired memory section in the transaction data memory 38. The transaction data memory 38 includes 24 (twenty-four) memory sections for storing the transaction data which is registered in one hour. The one hour control signal derived from the one hour signal generator 42 is further applied to a clear signal generation circuit 46, whereby the transaction data temporarily stored in the buffer memory 34 is cleared after the accumulated transaction data is transferred to a selected memory section in the transaction data memory 38. More specifically, when the one hour control signal is developed at 3 a.m., the input control circuit 44 develops the control signal to make conductive the third AND gate $G_3$ for introducing the transaction data temporarily stored in the buffer memory 34 into the third memory section $M_3$ in the transaction data memory 38. After transferring the transaction data, the buffer memory 34 is cleared for initiating the accumulation operation of the next data which should be introduced into the fourth memory section in the transaction data memory 38. Therefore, each of the memory sections in the transaction data memory 38 stores the transaction amount registered in one hour.

The thus stored transaction data is read out in the following way when a checking mode key 48 included in the mode selection switch 20 is actuated.

When the checking mode key 48 is actuated, AND gates 50 and 52 are made conductive. If the entire data stored in the main memory 16 and the memory sections $M_1$ through $M_{24}$ in the transaction data memory 38 is desired to be read out, a checking key 54 included in the function key panel 12 is actuated. The central processor unit 14 functions to control the print out operation of the transaction data stored in the main memory 16. Further, the AND gate 50 develops a control signal in response to the actuation of the checking key 54. The control signal derived from the AND gate 50 is applied to the read out control circuit 40 which develops control signals to enable all of the AND gates $O_1$ through $O_{24}$, each of which is associated with one of the memory sections $M_1$ through $M_{24}$ of the transaction data memory 38. Thus, the transaction data stored in each of the memory sections $M_1$ through $M_{24}$ of the transaction data memory 38 is applied to the printer system 32 via the AND gates $O_1$ through $O_{24}$.

If only the transaction data stored in the memory sections $M_1$ through $M_5$ of the transaction data memory 38 is required to be read out, the numeral key "1" included in the numeral information key input panel 10, a time period selection key 56 (→) included in the function key panel 12, and the numeral key "5" included in the numeral information key input panel 10 are actuated in this order. The thus introduced time period information is stored in a time period buffer memory 58. Thereafter, a time key 60 included in the function key panel 12 is actuated to instruct the print out operation of the transaction data stored in the selected period of time. An AND gate 62 is made conductive via the AND gate 52 in response to the actuation of the time key 60 (T). The time period information stored in the time period buffer memory 58 is applied to the read out control circuit 40 via the AND gate 62. The read out control circuit 40 develops control signals to enable the AND gates $O_1$ through $O_5$, whereby the transaction data stored in the memory sections $M_1$ through $M_5$ of the transaction data memory 38 is applied to the printer system 32. In this way, the transaction data of a desired time is printed out onto a receipt slip and/or a journal paper.

If the transaction data stored in the memory section $M_3$ is only required to be printed out, the numeral key "3" included in the numeral information key input panel 10 is actuated and, then, the time key 60 (T) is actuated. The read out control circuit 40 functions to enable only the AND gate $O_3$, thereby applying the transaction data stored in the memory section $M_3$ of the transaction data memory 38 to the printer system 32.

A group selection circuit 64 can be added to select a desired group of the memory sections in the transaction data memory 38. The group selection circuit 64 is associated with group selection keys "a", "b", "c" and "d". When the group selection key "a" is actuated, the group selection circuit 64 develops a control signal for reading out the transaction data stored in the memory sections $M_1$ through $M_6$ of the transaction data memory 38. When the group selection key "b" is actuated, the group selection circuit 64 develops a control signal for reading out the transaction data stored in the memory sections $M_7$ through $M_{12}$ of the transaction data memory 38. When then the group selection key "c" is actuated, the group selection circuit 64 develops a control signal for reading out the transaction data stored in the memory sections $M_{13}$ through $M_{18}$ of the transaction data memory 38. The group selection key "d" is provided for reading out the transaction data stored in the memory sections $M_{19}$ through $M_{24}$.

The above-mentioned various sequences of the operation are controlled by programs stored in a programmable read only memory 66. The programmable read only memory 66 is preferable made of "M-2732" manufactured by Mitsubishi Denki Kabushiki Kaisha. The central processor unit 14 is preferably made of a microprocessor "Z-80" manufactured by Sharp Kabushiki Kaisha.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
   means for introducing data into said register;
   processor means responsive to the information from said means for introducing, for controlling the operation of said cash register;
   program memory means for controlling operations in said processor means;
   time information keeping means for generating current time information;
   one hour signal generation means connected to said time information keeping means for developing a memory control signal every hour;
   buffer memory means for accumulating transaction data developed by said processor means;
   accumulated transaction memory means including a plurality of memory sections, each for storing accumulated transaction data entered into said register by said means for introducing between two adjacent memory control signals;
   control means responsive to each said memory control signal for transferring the transaction data accumulated by said buffer memory means into a memory section of said accumulated transaction memory means associated with said received control signal, said control means further clearing said buffer memory means after the transfer;
   means for printing accumulated transaction data stored in the memory sections of said accumulated transaction memory means; and
   a print control system including,
      means for selecting at least one of said memory sections in said memory means, and
      transfer means responsive to said means for selecting, for supplying the total amount stored in said at least one selected memory sections to said means for printing.

2. The electronic cash register of claim 1, wherein:
   said memory control signal is developed on the hour and said accumulated transaction memory means includes 24 (twenty-four) memory sections, each of which store the transaction data which has been registered between said memory control signals.

3. The electronic cash register of claim 2, wherein said control means includes:

memory transfer timing means for applying the transaction data accumulated in said buffer memory means to a preselected memory section in said accumulated transaction memory means in response to said memory control signal; and clear signal generation means for developing a clear signal in response to said memory control signal, said clear signal being applied to said buffer memory means for clearing the contents accumulated therein.

4. The electronic cash register of claim 1, 2 or 3, wherein said selection means includes a keyboard panel for introducing a memory section identifying signal to thereby select a desired memory section in said accumulated transaction memory means.

5. The electronic cash register of claim 4, wherein said selection means includes a group selection means for selecting a desired group of memory sections, said group comprising at least two memory sections in said accumulated transaction memory means.

* * * * *